US012691305B1

(12) United States Patent
Yurechko

(10) Patent No.: US 12,691,305 B1
(45) Date of Patent: Jul. 28, 2026

(54) METHOD TO CALCULATE FIT FACTOR AND PROTECTION FACTOR WITH A DYNAMICALLY CHANGING BACKGROUND CHALLENGE

(71) Applicant: U.S. Army Combat Capabilities Development Command, Chemical Biological Center, APG, MD (US)

(72) Inventor: Steven A Yurechko, Port Deposit, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 473 days.

(21) Appl. No.: 18/365,378

(22) Filed: Aug. 4, 2023

(51) Int. Cl.
*A62B 27/00* (2006.01)

(52) U.S. Cl.
CPC .................................. *A62B 27/00* (2013.01)

(58) Field of Classification Search
CPC ..................................................... A62B 27/00
USPC ..... 73/40, 38, 863.21, 863.41, 863.71, 40.7, 73/46, 52
See application file for complete search history.

(56) References Cited

U.S. PATENT DOCUMENTS

2020/0269076 A1 * 8/2020 Farmer .................. G01M 3/20

OTHER PUBLICATIONS

Model 8587A Laser Photometer Operation and Service Manual, TSI Incorporated, Apr. 2008 (Year: 2008).*

* cited by examiner

*Primary Examiner* — John E Breene
*Assistant Examiner* — Truong D Phan
(74) *Attorney, Agent, or Firm* — Ulysses John Biffoni

(57) ABSTRACT

A method for quantitatively evaluating the protective efficacy of a respiratory protection mask in an environment with a dynamic pollutant concentration, including providing a first air sampling unit and a second air sampling unit both electronically connected to a data acquisition system, obtaining a first pollutant reading of the environment with the dynamic pollutant concentration using the first air sampling unit, obtaining a second pollutant reading of the respiratory protection mask in the environment using the second air sampling unit, and determining a fit factor of the respiratory protection mask using the data acquisition system by dividing the first pollutant reading by the second pollutant reading. The method additionally includes determining a correction factor between the first air sampling unit and the second air sampling unit and applying the correction factor to the second air sampling unit using the data acquisition system.

19 Claims, 6 Drawing Sheets

METHOD TO CALCULATE FIT FACTOR AND PROTECTION FACTOR WITH A DYNAMICALLY CHANGING BACKGROUND CHALLENGE

GOVERNMENT INTEREST

The invention described herein may be manufactured, used and licensed by or for the U.S. Government.

FIELD OF THE INVENTION

The present invention relates to a method for quantitatively evaluating the protective efficacy of respiratory protection masks, and more particularly to a method for quantitatively evaluating the protective efficacy of respiratory protection masks in an environment with a dynamic environmental concentration.

BACKGROUND OF THE INVENTION

When quantitatively evaluating the protective efficacy of respiratory protection masks, the respiratory protection mask being tested is placed on a subject who then enters a chamber filled with aerosol simulant. Exercises are then performed which are designed to stress the seal of the mask. During this time, aerosol sampling devices and a data acquisition system (DAS) compare the aerosol concentration in the test chamber to that inside the mask. The ratio between the chamber aerosol concentration to the in-mask concentration is known as the Fit Factor (FF) or Protection Factor (PF), which are used interchangeably herein, and is reported in near real time by the data acquisition system. Generally, FF is calculated according to Equation 1 below. Equation 1:

$$FF = \frac{C_{Challange}}{C_{Respirator}}$$

where FF is Fit Factor, C challenge is Test Chamber Concentration (Upstream), and C respirator is In Mask Concentration (Downstream).

In existing testing situations, a single aerosol sampling instrument is used to acquire a background (Upstream) value for the test chamber prior to sampling inside of the mask (Downstream). More particularly, a current software routine to calculate PF with one photometer, as shown in FIG. 1, includes a DAS instructing a single photometer to record an upstream concentration value (test chamber background), to switch to "Purge" to record a "Zero" (instrument zero value), and then to switch to downstream to record in mask concentration. Using this traditional method, the upstream value of the test chamber aerosol concentration, that is the background value, is a static value given that it is only sampled once for a determined amount of time and then saved in memory to be used in the calculation for Fit Factor or Protection Factor. The PF is then calculated in real time by dividing the single recorded upstream static value of the test chamber by the aerosol sampled downstream in the mask. This is considered correct since it is assumed that the aerosol concentration background in the testing chamber will be kept constant during the testing. However, in the event that the aerosol concentration in the test chamber does not remain constant after the initial background sample, of which there are many instances, the results for Fit Factor or Protection Factor are unknowingly inaccurate, which can be significantly dangerous for the wearer of the mask.

Furthermore, typical test chambers must be controlled laboratory environments and must meet exacting certification standards in order to maintain a constant background aerosol concentration, making such test facilities expensive to set up and maintain, limited in availability and accessibility, and restrictive as far as the operations and tests that can be conducted therein.

Thus, there exists a need for a method for quantitatively evaluating the protective efficacy of respiratory protection masks in an environment with a dynamic environmental concentration, whether the dynamic environmental concentration is accidental due to for example a leak in the test chamber or intentional in order to reduce the requirements and related expenses for test facilities and to increase possible testing scenarios.

SUMMARY OF THE INVENTION

The present invention provides a method for quantitatively evaluating the protective efficacy of a respiratory protection mask in an environment with a dynamic pollutant concentration, the pollutant being an aerosol, a vapor, or a combination thereof. The method includes providing a first air sampling unit and a second air sampling unit both electronically connected to a data acquisition system, obtaining a first pollutant reading of the environment with the dynamic pollutant concentration using the first air sampling unit, obtaining a second pollutant reading of the respiratory protection mask in the environment using the second air sampling unit, and determining a fit factor of the respiratory protection mask using the data acquisition system by dividing the first pollutant reading by the second pollutant reading. According to embodiments, the method additionally includes determining a correction factor between the first air sampling unit and the second air sampling unit and applying the correction factor to the second air sampling unit using the data acquisition system.

BRIEF DESCRIPTION OF THE DRAWINGS

The present invention is further detailed with respect to the following figures that depict various aspects of the present invention.

DESCRIPTION OF THE INVENTION

Figure 1:
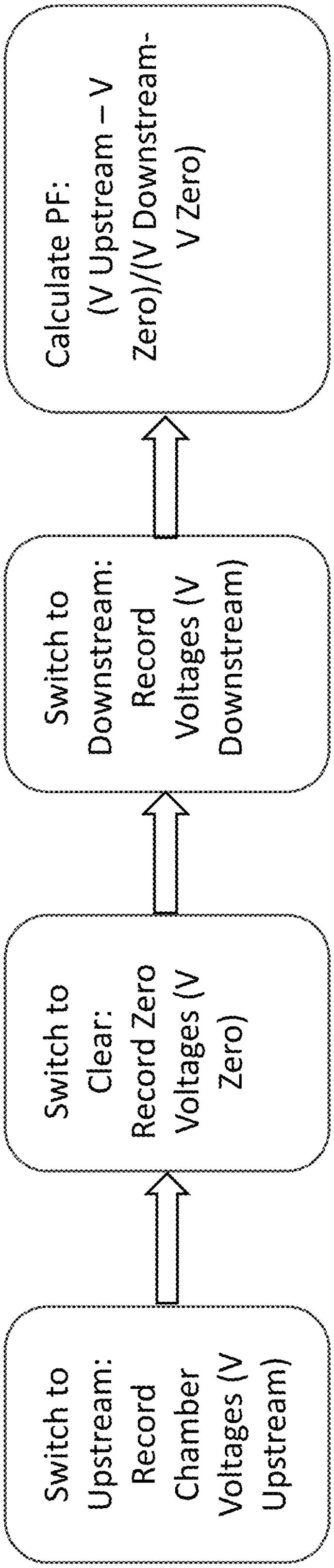
FIG. 1 PRIOR ART
FIG. 1 is a flowchart showing an existing method for calculating a protection factor with one photometer.

The present invention has utility as a method for quantitatively evaluating the protective efficacy of respiratory protection masks in an environment with a dynamic environmental concentration. The present invention thereby provides the benefit of more reliable test results, reduced requirements, and related expenses for test facilities, and increased possible testing scenarios.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to embodiments, a method for quantitatively evaluating the protective efficacy of respiratory protection masks in an environment with a dynamic environmental concentration. The method utilizes two aerosol sampling systems with accompanying software of a data acquisition system (DAS) to calculate accurate Fit Factor and Protection factor values with a dynamic background concentration as opposed to a static background concentration. The method described shall reference aerosol testing but may be also used for vapor testing. The terms Fit Factor (FF) and Protection Factor (PF) may be used interchangeably for the purpose of describing this method.

According to embodiments, a method for quantitatively evaluating the protective efficacy of respiratory protection masks in an environment with a dynamic environmental concentration includes obtaining a photometer reading of the background test environment ($C_{Challenge}$) using a first photometer, obtaining a photometer reading of in mask concentration ($C_{respirator}$) using a second photometer, and calculating a real time Fit Factor (FF) using Equation 1 above in a customized DAS. Notably, $C_{Challenge}$, $C_{respirator}$, and FF are all dynamic values. The mask so being tested forming a seal with a substrate. The substrate being human anatomy or a model simulative thereof.

Figure 2:
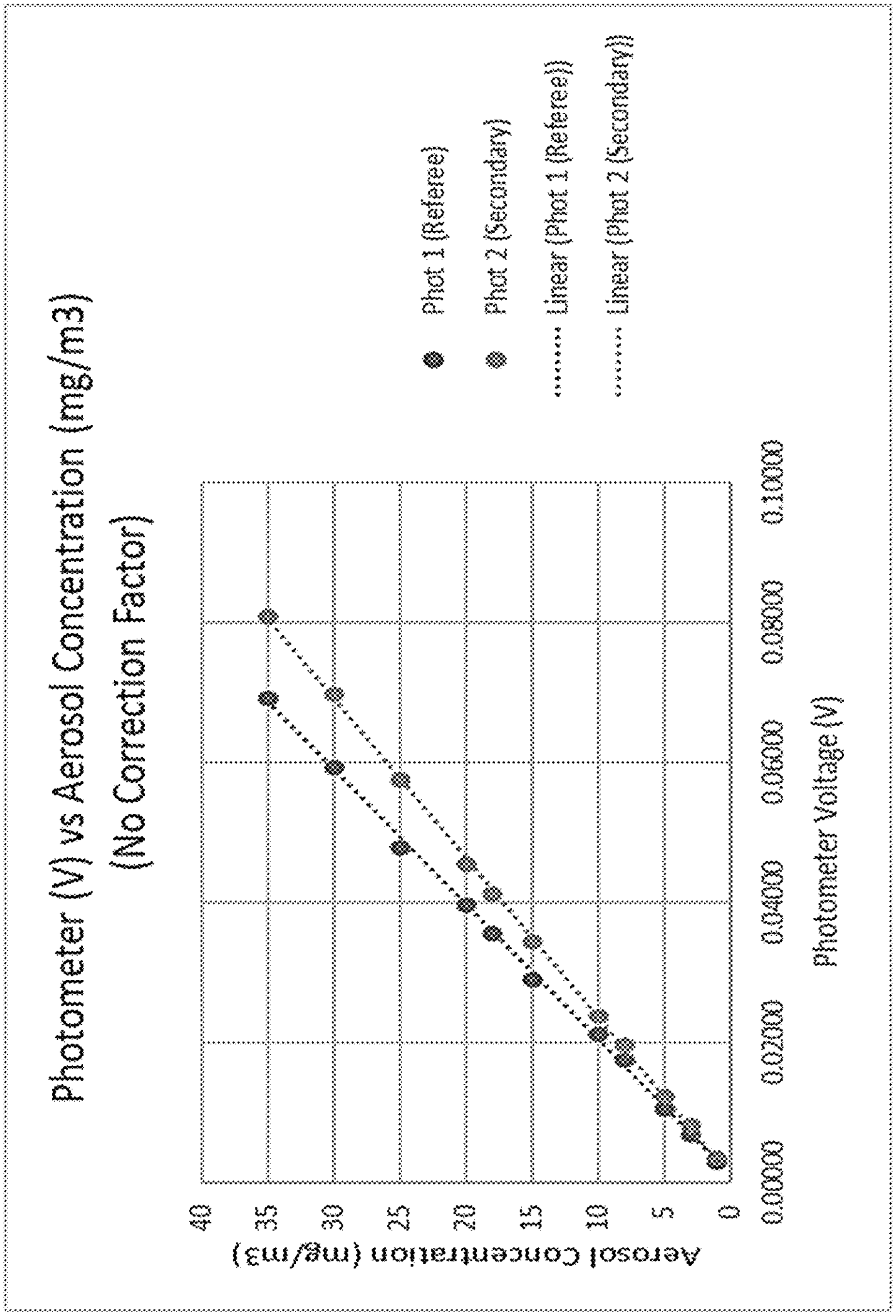
FIG. 2 is a plot showing Photometer Voltage vs Aerosol Concentration for two photometers with no Correction Factor applied.
Figure 3:
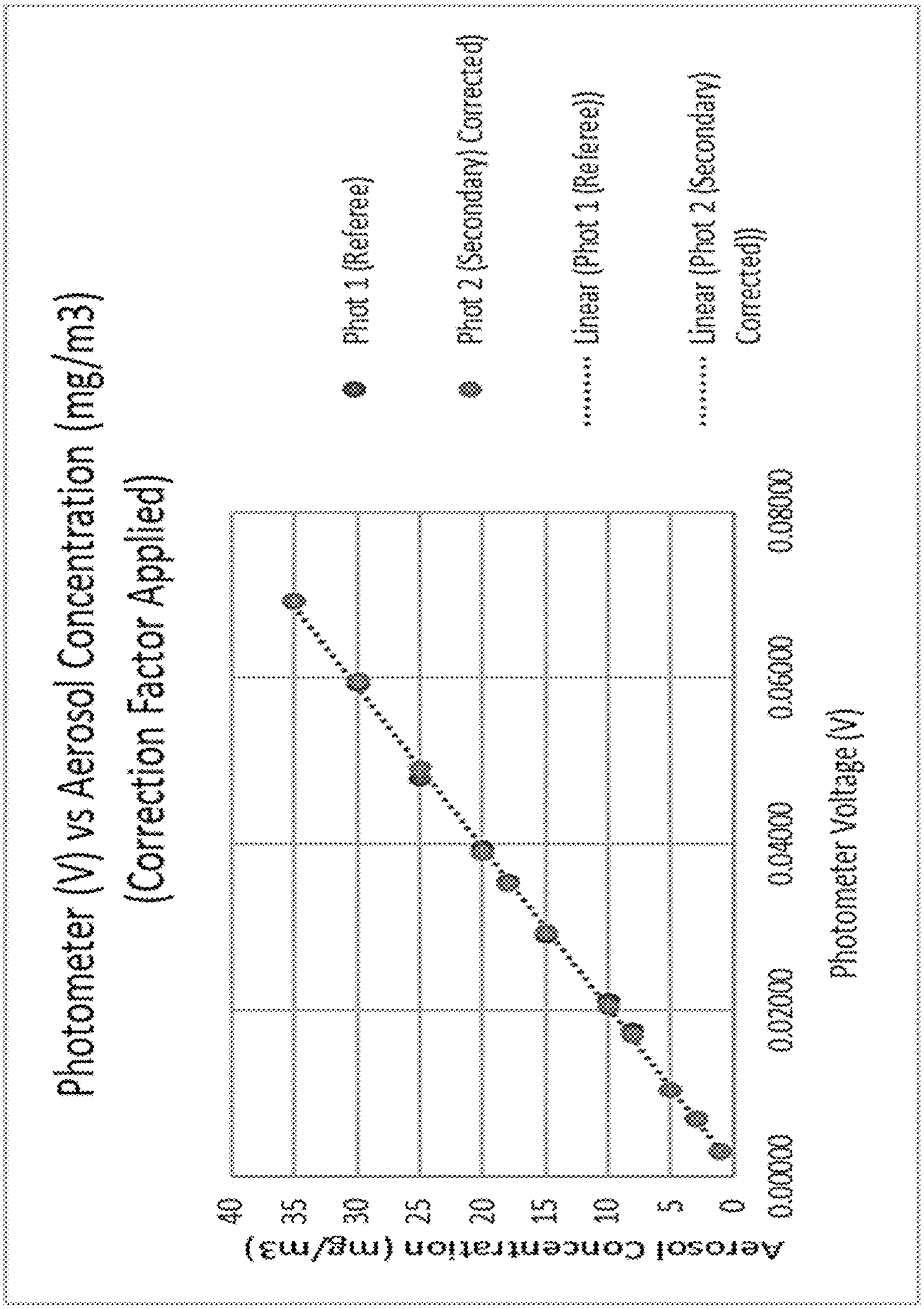
FIG. 3 is a plot showing Photometer Voltage vs Aerosol Concentration for two photometers with a determined Correction Factor applied to the secondary photometer.

According to embodiments, the method includes first determining a correction factor (CF) for the two photometers. No two sampling instruments are exactly alike due to variations in internal components. This does not matter when using one instrument to perform all sampling but is significant when using two instruments together. For this reason, a correction factor (CF) is determined. This is accomplished by recording the voltage values of each photometer at various intervals in an aerosol chamber as the aerosol concentration inside of the chamber is increased. FIG. 2 shows a plot showing the aerosol concentration of the test chamber versus the photometer voltage of a first photometer (the plotted line nearest the y-axis) and of a second photometer (the plotted line nearest the x-axis). After the values collected are plotted, a percent difference is calculated for the secondary photometer values compared to first (referee) photometer values in order to determine a correction factor (CF). This correction factor is applied to the secondary photometer signal output in the DAS so that the values are equivalent to the first reference photometer, as shown in the plot of FIG. 3.

Figure 4:
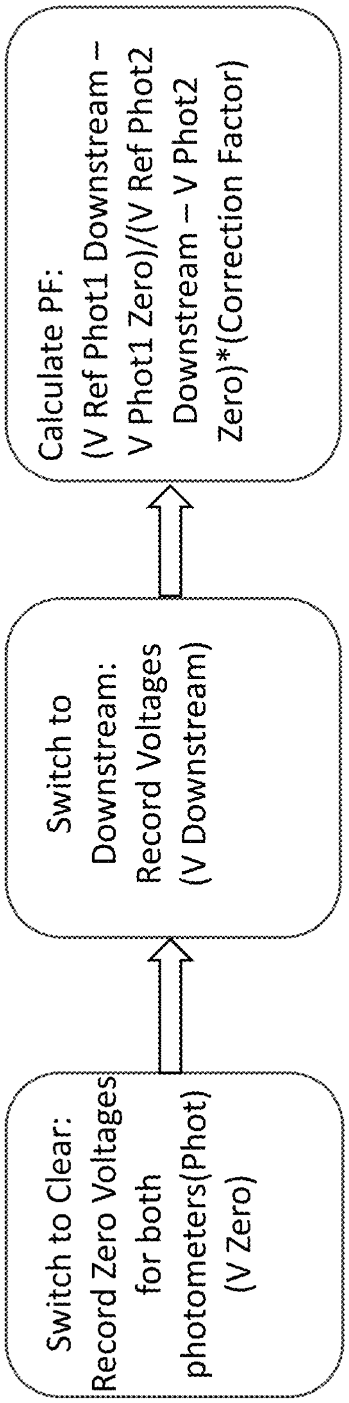
FIG. 4 is a flowchart showing an inventive method for calculating a PF using two Photometers, denoted as Phot1 and Phot 2 therein, according to embodiments of the present invention.

After the correction factor is determined, it is applied to the signal output for the secondary photometer, Phot2, through the DAS software. The DAS software routine for conducting PF testing is shown in FIG. 4 in which the primary photometer is denoted as Phot1.

According to embodiments, the aerosol sampling photometers are laser photometers. According to embodiments, the aerosol sampling photometers are TSI 8587A aerosol photometers. However, the inventive method may be used with any device that samples aerosol or vapor for the purpose of Fit Factor and Protection Factor testing. According to embodiments, when determining the correction factor, the aerosol concentration is monitored during using a TSI Dust Trak monitor.

According to embodiments, the upstream sample port of both photometers is unused. According to embodiments, the downstream connection port of the first (referee) photometer is connected to the aerosol test chamber while the downstream connection port of the secondary photometer remains connected to the mask on the test subject.

Embodiments of the present invention for a method for quantitatively evaluating the protective efficacy of respiratory protection masks in an environment with a dynamic environmental concentration provide at least three main advantages over the traditional method. First, because the inventive method accounts for a dynamic background concentration, the present invention provides more accurate results compared to traditional methods in that the present invention avoids the problem of unknown dynamic background, for example caused by a leaky test chamber. Second, because the inventive method removes the need for a constant background concentrations, individuals that require PF testing may be able to use any chamber that is available for testing and not chambers that were specifically certified to be compliant with the background challenge requirements and various PF testing test standards. This provides cost savings for these tests while still ensuring that accurate PF values are collected and reported since it will no longer be necessary to test at certified and expensive laboratory locations. Finally, the inventive method increases possible testing scenarios that were never before possible using the traditional testing method within a static testing chamber with constant aerosol concentrations. That is, protection Factor testing is also used to conduct training for first responders who wear masks to simulate operationally relevant scenarios. These tests consist of the individual performing basic movements inside of the chamber to quantitatively evaluate their PF. With the creation of this inventive method, more operationally relevant scenarios may be created to evaluate PF. Such an example may consist of the individual disarming a mock chemical agent device. The test chamber would initially have no background concentration inside but after the mock device would "detonate," the background would rise while the individual wearing the protective mask continued their exercises. This scenario is impossible to accurately calculate with traditional PF methods but is achievable by using the inventive method described herein.

The following example demonstrates that the PF values calculated using the method of the present invention are equally accurate as those determined using the traditional method.

Example 1

Using the original method for calculating PF, both of the photometers utilized for the updated method have PF calculated for a HEPA filter, a low micron orifice, and a high micron orifice which correlate to a max reading PF, mid-range PF score, and low PF score respectively. These same items were then tested using the modified software routine and were compared to the values obtained from the original method. The results are shown in Tables 1-3.

TABLE 1

PF testing for HEPA filter for maximum PF Value

| Photometer | Test Item (Max PF) | Sample Number (One Minute Duration) Sample 1 | Sample 2 | Sample 3 | Sample 4 | Sample 5 | Overall PF |
|---|---|---|---|---|---|---|---|
| Referee (Original Method) | HEPA | 100,000 | 100,000 | 100,000 | 100,000 | 100,000 | 100,000 |
| Secondary (Original Method) | HEPA | 98,708 | 100,000 | 100,000 | 100,000 | 100,000 | 99,739 |
| Updated Method (Combined Referee/ Secondary) | HEPA | 97,860 | 97,384 | 97,055 | 97,866 | 97,342 | 97,500 |

TABLE 2

PF Testing for 40 um Orifice for Mid Level PF Value

| Photometer | Test (Mid Item Level PF) | Sample Number (One Minute Duration) Sample 1 | Sample 2 | Sample 3 | Sample 4 | Sample 5 | Overall PF |
|---|---|---|---|---|---|---|---|
| Referee (Original Method) | 40 um Orifice | 8,761 | 5,456 | 3,988 | 3,747 | 3,687 | 4,603 |
| Secondary (Original Method) | 40 um Orifice | 5,369 | 4,167 | 3,853 | 3,234 | 3,303 | 3,853 |
| Updated Method (Combined Referee/ Secondary) | 40 um Orifice | 4,123 | 3,180 | 2,960 | 2,827 | 2,670 | 3,080 |

TABLE 3

PF Testing for 200 um Orifice for Low Level PF Value

| Photometer | Test Item (Low Level PF) | Sample Number (One Minute Duration) Sample 1 | Sample 2 | Sample 3 | Sample 4 | Sample 5 | Overall PF |
|---|---|---|---|---|---|---|---|
| Referee (Original Method) | 200 um Orifice | 51 | 50 | 51 | 51 | 51 | 51 |

TABLE 3-continued

PF Testing for 200 um Orifice for Low Level PF Value

| Photometer | Test Item (Low Level PF) | Sample Number (One Minute Duration) Sample 1 | Sample 2 | Sample 3 | Sample 4 | Sample 5 | Overall PF |
|---|---|---|---|---|---|---|---|
| Secondary (Original Method) | 200 um Orifice | 55 | 55 | 55 | 56 | 56 | 55 |
| Updated Method (Combined Referee/ Secondary) | 200 um Orifice | 53 | 53 | 52 | 53 | 53 | 53 |

While it is very difficult replicate PF values across different photometers and orifices, the values obtained and shown above demonstrate that the inventive method is capable of providing results equivalent to the original method for calculating PF.

Example 2

Figure 5:
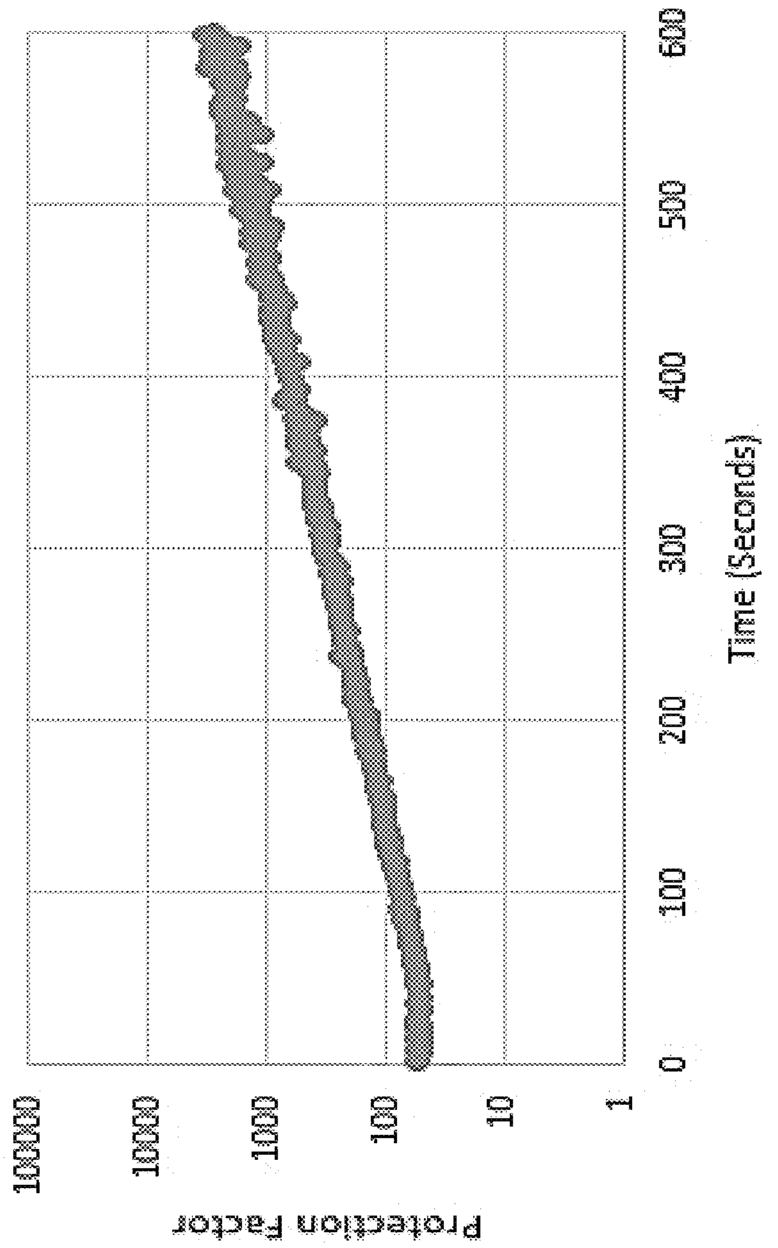
FIG. 5 is a plot showing PF over Time calculated using existing methods in an environment with decreasing background concentration.

In order to highlight the power of this inventive method, an additional test is conducted between the original and inventive PF methods for the aerosol concentration inside of a test chamber to become dynamic over time. To accomplish this, a 200 um orifice is chosen as the test item to be used with the photometer. The chamber is brought to a steady state of aerosol concentration and then turned off while the DAS records PF in real time. The chamber purges aerosol naturally over time representing a decrease in aerosol concentration and thus making this a dynamic background test. This test is performed for the referee photometer and then for the modified dynamic background method. Results are shown in FIGS. 5 and 6.

When using the 200 um orifice, the PF values generated are expected to be approximately 50 PF. As shown in FIG. 5, the PF starts around 50, but gradually increases due to the amount of aerosol that decreases in the chamber over time. Since the background value is only recorded at the start of the trial when the concentration was higher, the PF gradually rises, as shown in FIG. 5.

Figure 6:
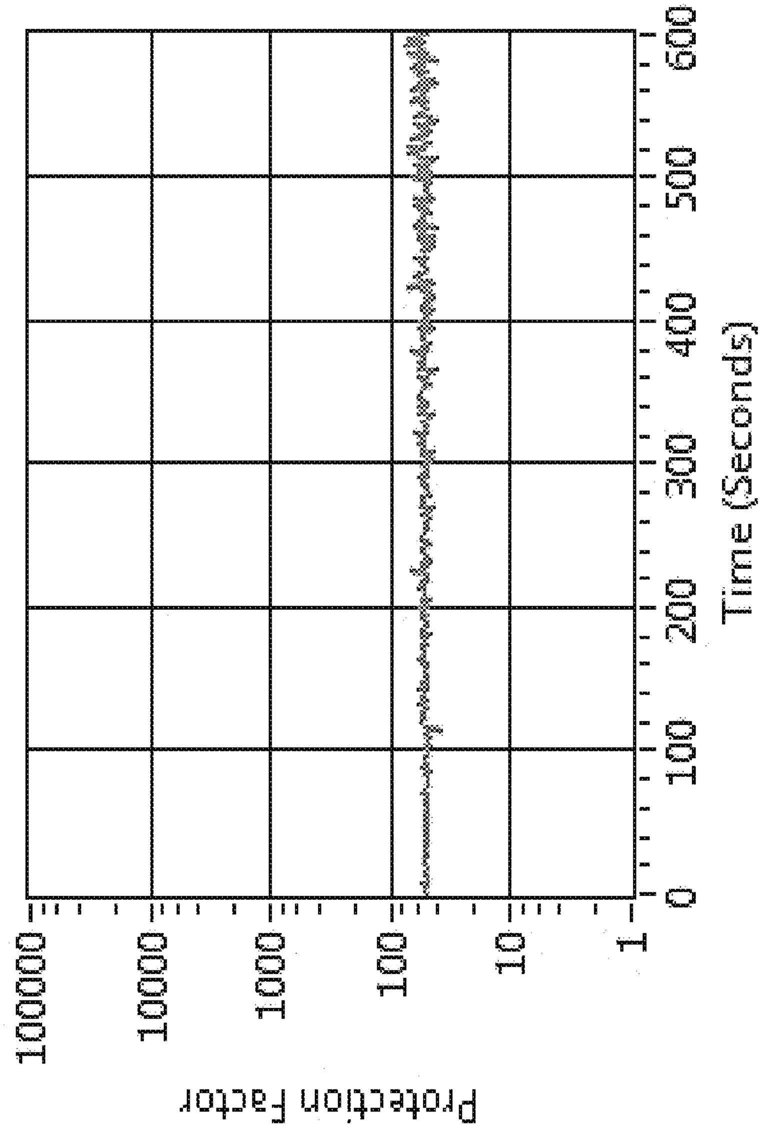
FIG. 6 is a plot showing PF over Time calculated using the inventive method in an environment with decreasing background concentration.

As shown in FIG. 6, the inventive method for calculating PF in a dynamic environment results in a calculated PF of approximately 50 over the course of the test even though the background concentration decreases. This is because the Upstream values from the referee photometer are constantly being compared to the Downstream values from the secondary photometer as opposed to being recorded once before a test starts.

The above tests confirm that the inventive method to calculate PF with a dynamic background challenge is just as accurate as the original method to calculate PF and can accurately measure PF with a dynamic background.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A method for quantitatively evaluating the protective efficacy of a respiratory protection mask in an environment with a dynamic pollutant concentration, the method comprising:

providing a first air sampling unit and a second air sampling unit, both the first air sampling unit and the second air sampling unit electronically connected to a data acquisition system;

determining a correction factor between the first air sampling unit and the second air sampling unit and applying the correction factor to the second air sampling unit using the data acquisition system;

positioning the respiratory protection mask in the environment with the dynamic pollutant concentration, the respiratory protection mask forming a seal with a substrate;

obtaining a first pollutant reading of the environment with the dynamic pollutant concentration using the first air sampling unit;

obtaining a second pollutant reading of the respiratory protection mask using the second air sampling unit; and determining a fit factor of the respiratory protection mask using the data acquisition system by dividing the first pollutant reading by the second pollutant reading.

2. The method of claim 1, wherein determining the correction factor comprises:

recording a plurality of voltage values of each of the first air sampling unit and the second air sampling unit at various time intervals in the environment with the dynamic pollutant concentration as the pollutant concentration inside is increased;

calculating a percent difference in the plurality of voltage values of the first air sampling unit and the plurality of voltage values of the second air sampling unit to determine the correction factor between the first air sampling unit and the second air sampling unit.

3. The method of claim 1, wherein the pollutant is an aerosol, a vapor, or a combination thereof.

4. The method of claim 1, wherein the first air sampling unit and the second air sampling unit are photometers.

5. The method of claim 4, wherein the photometers are laser photometers.

6. The method of claim 4, wherein the photometers are TSI 8587 A aerosol photometers.

7. The method of claim 1, wherein the data acquisition system includes software configured to control the operation of the first air sampling unit and the second air sampling unit.

8. The method of claim 7, wherein the software of the data acquisition system instructs the first air sampling unit and second air sampling unit to switch to clear where zero voltages for both the first air sampling unit and second air sampling unit are recorded, instructs the first air sampling unit and second air sampling unit to switch to downstream where a downstream voltage for the first air sampling unit is recorded and a downstream voltage of the second air sampling unit is recorded, and then calculates the fit factor according to:

$$\text{Fit Factor} = \left(\frac{(\text{Downstream Volatge of first unit} - \text{Zero Voltage of first unit})}{(\text{Downstream Volatge of second unit} - \text{Zero Volate of second unit}) * \text{Correction Factor}}\right)$$

9. The method of claim 1, wherein the substrate is a human subject.

10. The method of claim 9, wherein the subject performs movements inside the environment with the dynamic pollutant concentration as the protective efficacy of the respiratory protection mask is evaluated.

11. The method of claim 1, wherein the dynamic pollutant concentration of the environment is varied overtime to simulate a plurality of test scenarios.

12. The method of claim 1, wherein the environment with the dynamic pollutant concentration is not necessarily compliant with test standards for fit factor testing.

13. A method for quantitatively evaluating the protective efficacy of a respiratory protection mask in an environment with a dynamic pollutant concentration, the method comprising:

providing a first air sampling unit and a second air sampling unit, both the first air sampling unit and the second air sampling unit electronically connected to a data acquisition system, wherein the data acquisition system includes software configured to control the operation of the first air sampling unit and the second air sampling unit;

positioning the respiratory protection mask in the environment with the dynamic pollutant concentration, the respiratory protection mask forming a seal with a substrate;

obtaining a first pollutant reading of the environment with the dynamic pollutant concentration using the first air sampling unit;

obtaining a second pollutant reading of the respiratory protection mask using the second air sampling unit; and determining a fit factor of the respiratory protection mask using the data acquisition system by dividing the first pollutant reading by the second pollutant reading, wherein the software of the data acquisition system instructs the first air sampling unit and second air sampling unit to switch to clear where zero voltages for both the first air sampling unit and second air sampling unit are recorded, instructs the first air sampling unit and second air sampling unit to switch to downstream where a downstream voltage for the first air sampling unit is recorded and a downstream voltage of the second air sampling unit is recorded, and then calculates the fit factor according to:

$$\text{Fit Factor} = \left(\frac{(\text{Downstream Volatge of first unit} - \text{Zero Voltage of first unit})}{(\text{Downstream Volatge of second unit} - \text{Zero Volate of second unit}) * \text{Correction Factor}}\right)$$

14. The method of claim 13, wherein the pollutant is an aerosol, a vapor, or a combination thereof.

15. The method of claim 13, wherein the first air sampling unit and the second air sampling unit are photometers.

16. The method of claim 15, wherein the photometers are laser photometers.

17. The method of claim 13, wherein the substrate is a human subject and wherein the subject performs movements inside the environment with the dynamic pollutant concentration as the protective efficacy of the respiratory protection mask is evaluated.

18. The method of claim 13, wherein the dynamic pollutant concentration of the environment is varied overtime to simulate a plurality of test scenarios.

19. The method of claim 13, wherein the environment with the dynamic pollutant concentration is not necessarily compliant with test standards for fit factor testing.

* * * * *